(12) United States Patent
Araujo et al.

(10) Patent No.: US 7,833,636 B2
(45) Date of Patent: Nov. 16, 2010

(54) PISTON RING WITH SULPHONITRIDING TREATMENT

(75) Inventors: Juliano Avelar Araujo, Sao Paulo (BR); Gisela Ablas Marques, Sao Paulo (BR); Jose Valentim Lima Sarabanda, Rugby (GB)

(73) Assignees: MAHLE International GmbH, Stuttgart (DE); MAHLE Metal Leve, S.A., Sao Paulo (BR)

( * ) Notice: Subject to any disclaimer, the term of this patent is extended or adjusted under 35 U.S.C. 154(b) by 302 days.

(21) Appl. No.: 11/920,895

(22) PCT Filed: Jun. 16, 2007

(86) PCT No.: PCT/EP2007/005313

§ 371 (c)(1),
(2), (4) Date: May 2, 2008

(87) PCT Pub. No.: WO2008/154934

PCT Pub. Date: Dec. 24, 2008

(65) Prior Publication Data

US 2010/0001474 A1    Jan. 7, 2010

(51) Int. Cl.
*B32B 9/00* (2006.01)
(52) U.S. Cl. .................. 428/697; 428/704; 428/698; 428/699; 428/323
(58) Field of Classification Search .................. 428/704, 428/697, 698, 699, 323
See application file for complete search history.

(56) References Cited

U.S. PATENT DOCUMENTS

| | | | |
|---|---|---|---|
| 5,187,017 A | 2/1993 | Hatano et al. | |
| 5,316,321 A | 5/1994 | Ishida et al. | |
| 5,985,428 A | 11/1999 | Chiba | |
| 6,279,913 B1 | 8/2001 | Iwashita et al. | |
| 6,726,216 B2 | 4/2004 | Horn et al. | |
| 6,804,944 B2 | 10/2004 | Seiki et al. | |

FOREIGN PATENT DOCUMENTS

| | | |
|---|---|---|
| DE | 0 152 945 | 12/1981 |
| JP | 55-011107 | 1/1980 |
| JP | 09-158873 | 6/1997 |
| JP | 10-217241 | 8/1998 |
| JP | 10-219423 | 8/1998 |
| JP | 2002-005017 | 1/2002 |

OTHER PUBLICATIONS

International Search Report.
Daikoko et al., "Wear Property of Sulurizing and Nitriding Treatment," Bulletin of the JSME, vol. 8, No. 31, 1965, pp. 475-491. XP-008087962 (ISR).
Ma et al., "Study on Friction and Wear Characteristics and Structure of Compound Layer from Combined Treatment of Ion . . . ," Cailiao Rechuli Xuebao Bianjibu, vol. 25, No. 5, Pt. 2, 2004, pp. 649-652. XP-008087965 (ISR).

*Primary Examiner*—Gwendolyn Blackwell
(74) *Attorney, Agent, or Firm*—Collard & Roe, P.C.

(57) ABSTRACT

The present invention relates to a piston ring for an internal combustion engine, the piston ring comprises a sulphide rich compound layer forming a surface layer, said sulphide rich compound layer comprising an iron nitride matrix with iron sulphide (FeS) inclusions embedded in said matrix, said sulphide rich compound layer having a sulphur content of 1 to 4 wt % S and a nitrogen content of 10 to 20 wt % N.

17 Claims, 5 Drawing Sheets

PISTON RING WITH SULPHONITRIDING TREATMENT

CROSS REFERENCE TO RELATED APPLICATIONS

Applicants claim priority under 35 U.S.C. §119 and 35 U.S.C. §365 of PCT/EP2007/005313 filed Jun. 16, 2007. The international application under PCT article 21(2) was published in English.

BACKGROUND OF THE INVENTION

1. Technical Field of the Invention

The present invention relates to a piston ring used in internal combustion engines.

2. Description of the Related Art

In recent years, engines must meet increased demands for higher output, alternative fuels and longer product service life and must also comply with even stricter exhaust gas emission regulations. All these circumstances lead to a reduction in the oil film thickness between the piston ring and the cylinder wall, leading to a higher direct contact of the mating surfaces. The piston ring must therefore work in a more severe operating environment, which requires higher scuffing and wear resistance.

Considering the current arrangement of piston rings, the top ring is the most stressed concerning high pressure and high temperatures, due to its closeness with the combustion chamber; also it is the ring that works with the thinnest oil film. Therefore, top rings are usually nitrided.

Gas Nitrided Steel (GNS) is a common technology used for top rings in Otto engines. Gas nitriding is a case-hardening process whereby nitrogen is introduced into the surface of solid ferrous alloys by holding the metal at suitable temperature in contact with a nitrogen containing gas, usually ammonia. The process of nitriding steels produces less distortion or deformation than either carburizing processes or conventional hardening processes. Main reasons for nitriding are to obtain piston rings with high surface hardness, to increase wear resistance and scuffing resistance properties and to improve fatigue life.

However, in more severe cases, even the hard nitrided layer of the conventional art is not resistant enough to avoid scuffing. This may occur especially on flex-fueled vehicles (FFV) engines, where the combustion strategy has to address different fuels. In some conditions, richer fuel mixtures can cause cylinder fuel washing, leading to lack of oil film, and consequently to a strong contact between the mating parts which is prone to scuffing occurrence.

In an attempt to minimize the above-described scenario, U.S. Pat. No. 6,726,216 discloses a piston ring comprising a region of increased nitride content, whereby the piston ring is oxynitride-hardened, comprising an oxide layer, which is formed over the nitrided layer. During operation, said oxide layer is in sliding contact with the cylinder wall and it reduces the friction coefficient, consequently improving the sliding functions during the run-in of the engine. Another advantage of the oxide layer is the increase in the material resistance against corrosive media. Despite of such improvements, there are still limitations concerning scuffing occurrence on oxygen-containing layers because a porous rigid area is developed in the outer region of the composite layer surface, negatively influencing the operational behavior of the components stressed by sliding friction.

Therefore, nitrided rings can become prone to scuffing when exposed to these conditions. Surface treatments and/or coatings have been applied to nitrided rings in order to overcome these problems, improving nitrided layer performance.

U.S. Pat. No. 6,279,913 discloses a method for applying amorphous carbon, i.e., a diamond-like carbon thin film, which is formed directly on a gas nitrided layer, by means of ion plating or reactive sputtering process. Nevertheless, when the irregularities on the surface to be covered are too fine, the diamond-like carbon film has a surface structure with a smooth layer shape and lack of adhesion is prone to occur. Further, when the irregularities on the surface to be covered are too large, the surface roughness of the diamond-like carbon film becomes higher so that the sliding characteristics degrade and peeling or film collapse is prone to occur, besides the burden of a high cost production.

Moreover, U.S. Pat. No. 5,316,321 describes a ceramic coating of chromium/titanium nitride deposited by a physical vapor deposition process over a nitrided layer. These ceramic coatings complement the hard gas nitrided layer by providing advantages not possessed by only the gas nitrided layer, such as higher scuff resistance and extremely high hardness. Yet, the desirable advantages offered by metallic nitride face coatings result in unwanted side effects. These coatings are particularly prone to chipping and may not achieve suitable coating thickness in case they lack sufficiently strong bonds with an underlying substrate. Since the TiN/CrN films are brittle due to their high hardness, excessive repetitive stress on the sliding surfaces during operation may generate cracks, causing peeling and loss of localized pieces of the coating.

In order to overcome the problems of the above-mentioned surface technologies, it is necessary to provide a solution with a superior scuffing and wear resistance and a competitive cost.

Considering other treatment techniques for protecting sliding surfaces, applied with regard to components other than piston rings, the so-called sulphonitriding treatment is disclosed in U.S. Pat. No. 6,804,944. More specifically, a spinning machine traveler comprising a sulphide layer over a nitrogen compound layer is disclosed, both layers being formed over a base material consisting of hard steel. After the sulphide layer has been worn away, due to normal working conditions, the nitrogen compound layer takes place, making it possible to perform spinning operation in a more stable manner, elongating the service life of the traveler. However, for piston ring applications, premature wear of the outmost surface leads to nitrided layer exposure, going back to the original problem of scuffing generation.

In addition, U.S. Pat. No. 5,985,428 discloses a method to treat working die steel members, forming a surface layer by a sulphonitriding process, consisting of an oxygen-containing mixed layer, comprising iron sulphide and iron nitride particles. Sulphur and nitrogen contents on the mixed layer satisfy the formula $0.5 \leq S/N \leq 10$.

Knowing that S is directly related to the formation of sulphides and N to the formation of nitrides, derived from the S/N relation, it can be inferred that in most of the cases, there is a high proportion of sulphides compared to nitrides. This high sulphide proportion promotes a layer with low wear resistance, due to low load carrying capacity of sulphides under sliding conditions. As explained before, one can expect poor scuffing resistance from oxygen-containing layers, as the one cited here containing from 1 to 15 wt % of oxygen.

Furthermore, U.S. Pat. No. 5,187,017 discloses a sliding member comprising Fe as a matrix and comprising a $FeS_2$ (ferric sulphide) layer on the topmost surface of the sliding member. According to this patent, $FeS_2$ is capable of retaining more lubricant as can be held by FeS, due to its inherent porosity. However, $FeS_2$ phase, for being a soft and continuous layer, presents high wear rate in high load carrying capacity applications. Also, $FeS_2$ layers easily peel off from an iron nitride layer.

The last three references mentioned are not related to the use of the sulphonitriding technology on internal combustion engine parts, particularly on piston rings, and none of them present both resistance to scuffing and wear.

Piston rings are designed to seal the combustion chamber from the crankcase (blow-by) and transfer heat from the piston to the cylinder. The rings also assist in controlling engine oil consumption, which has a strong influence on exhaust gas emissions. The effects of contact temperature and surface roughness on friction coefficient have an important role on the start up of the engine and this environment is prone to scuffing occurrence.

The selected surface treatment must be able to provide the above performance characteristics over the run-in of the engine and must be compatible with the cylinder wall and show optimal wear, friction, and scuff-proof behaviors as established by current engine demands.

The running face of a piston ring requires a material that reduces contact friction as much as possible and still allows the ring to perform its sealing function against the cylinder wall. Even though the ring's running face is usually sliding on a very thin layer of oil, in some points of the track there is lack of oil where the friction coefficient becomes higher. Minimizing such friction losses is a challenge, mainly at the run-in of the engine where the combined roughness of the mating parts (running face of the piston ring and the cylinder wall) is much higher than after break-in.

OBJECT OF THE INVENTION

In view of the foregoing, it is an object of the present invention to provide a piston ring for an internal combustion engine, which exhibits improved performance during its use, improved scuffing and wear resistance on the piston ring surface.

SUMMARY OF THE INVENTION

The object of the present invention is accomplished by a piston ring comprising a sulphide rich compound layer forming a surface layer, said sulphide rich compound layer comprising an iron nitride matrix with iron sulphide (FeS) inclusions embedded in said matrix, said sulphide rich compound layer having a sulphur content of 1 to 4 wt % S and a nitrogen content of 10 to 20 wt % N. More specifically, the object of the present invention is accomplished by a piston ring comprising (a) a base material; (b) a diffusion layer formed on said base material; (c) a compound layer formed on said diffusion layer; (d) a sulfide rich compound layer, said sulphide rich compound layer comprising an iron nitride matrix with iron sulphide (FeS) inclusions embedded in said matrix, said sulphide rich compound layer having a sulphur content of 1 to 4 wt % S and a nitrogen content of 10 to 20 wt % N.

The piston ring according to the present invention is provided with sulfur inclusions in the surface layer (sulphide rich compound layer). Such piston ring is cost-effective, with improved wear resistance properties and solving the problem of scuffing occurrence when used in FFV engines operated at high PCP (peak combustion pressure), as will be shown ahead. The sulphide rich compound layer reduces the adherence of the mating surfaces very effectively, which is of great importance for scuffing resistance improvement. Consequently, the friction coefficient of the surfaces becomes low, the wear resistance becomes high and the good resistance to scuffing is reached. The sulphonitriding technology fully enables the formation of the phase composition, structure and properties of treated layers by the possibility of continuous control of the quantity of iron sulphides formed in the iron nitride matrix.

The solution presented preferably comprises a dense compound layer, indicated here as sulphide rich compound layer, presenting a mixture of iron sulphide or FeS phase with iron nitride phases of type γ ($Fe_4N$) and iron nitride phases of type ε ($Fe_{2-3}N$), preferably free of oxygen. Since ε- and γ-phases usually present hardness from 900 to 1.200 Vickers, they will assure the wear resistance of the ring surface.

The FeS fraction is preferably higher than 0.1% and lower than 15%. If the FeS fraction is below 0.1%, it might not present the desired effect of providing decrease of the friction coefficient and improved wear properties. If FeS phase fraction is above 15%, it might present high wear and becomes useless the benefit during the initial demand of the component. This fraction between sulphide and nitride phases can be obtained with a well defined Sulphur and Nitrogen content.

The sulphide rich compound layer may further comprise inclusions of, besides FeS, at least two phases being selected from the group consisting of $Fe_{2-3}N$, $Fe_4N$, $Fe_4NC$, CrN and CrCN, which will further enhance the appropriated high hardness necessary for this sort of application. Oxygen presence on this layer would jeopardize good scuffing resistance properties. The sulphide rich compound layer thickness preferably shall be between 1 and 10 microns.

As it will be apparent from the foregoing description, the main feature of this novel sulphonitriding layer formed on the topmost surface of piston rings is the controlled formation of specific sulphides and nitrides with the sulphide rich compound layer and its chemical composition range from where this layer can be obtained—Sulphur from 0.1 to 4.0 wt % and Nitrogen from 10.0 to 20.0 wt %.

In a preferred embodiment, below the sulphide rich compound layer, there is a compound layer comprising ε- and γ-phases of iron nitride, i.e. $Fe_{2-3}N$ and $Fe_4N$, respectively. Thickness of the compound layer depends on the diffusion level of iron sulphides, which defines the sulphide rich compound layer, and varies according to the demand of the engine. Preferably thickness of the compound layer is from 0.1 to 10 micron. The compound layer should not be thinner than 0.1 micron otherwise to peel-off of the sulphide rich compound layer might occur. On the other hand, when the compound layer is thicker than 10 micron it is possible to occur surface cracks due to its brittleness.

In the preferred embodiment, below the compound layer there is a diffusion layer resulting from a nitrogen diffusion process, held by a suitable temperature, usually in the range of 450° C. to 600° C. The diffusion process shall produce a layer with the desired mechanical properties and a hardness profile presenting decreasing values from the compound layer interface to the base material, due to the iron nitride gradient.

A residual continuous iron sulphide layer will remain on the ring surface, which is inherent from the manufacturing process. According to the subsequent manufacturing operations this continuous iron sulphide layer can be removed by a simple brushing process. If the continuous iron sulphide layer is present, it is rapidly worn away under operation and the sulphide rich compound layer becomes functional. A sulphide continuous layer is not part of the solution because it wears out very easily, however it can be present without any damage to the ring performance.

FeS (iron sulphide), $\epsilon$-phase and $\gamma$-phase of iron nitride as described in the embodiments of the invention.

interrupted when Friction coefficient achieved 0.3—FAILURE, or when the maximum load was achieved, with a coefficient of friction lower than 0.3—RUNOUT (test completed without failure). The increase in the friction coefficient is due the disturbance of the oil film in between both mating parts, as the load is increased, the contact also increases and, consequently, the friction coefficient. It is known, in this test, that when Friction coefficient achieves 0.3 scuffing has already occurred.

Block-on-ring test conditions are as follows:
Part: segment of a 128 mm diameter piston ring
Material: 17% Cr martensitic stainless steel
Surface treatment: nitriding/oxynitriding/sulphonitriding as described in Table 1
Counter part:
Material: carbon steel
Hardness: 55 HRC
Lubricant oil: high performance oil for turbine lubrication—SAE 30
Temperature: room temperature
Speed: 500 rpm
Load: progressive increase from 0 to 499 N maximum (2 minutes of test)

TABLE 1

Processing parameters for ring samples to be tested.

| | | | Nitriding\ Sulphonitriding Conditions | | | Nitriding Layer Characteristics | | | | | |
| | | | | | | | Difusion | | | | |
| | Sample | Base Material | Time | NH3 flow (L/min) | Sulphur gas flow (L/min) | Temp (° C.) | Surface Hardness | Layer Depth (um) | Compound Layer Depth (um) | S % wt | N % wt | O % wt |
|---|---|---|---|---|---|---|---|---|---|---|---|---|
| Prior Art | 1 | Martensitic | 6 | 40 | — | 570 | 1000 | 70 | 6 | — | 12 | — |
| | 2 | Stainless Steel | 8 | 40 | — | 530 | 950 | 80 | 5 | — | 14 | — |
| | 3 | | 8 | 40 | — | 540 | 1000 | 80 | 5 | — | — | 10 |
| Invention/ | 4 | Martensitic | 7 | 30 | 15 | 550 | 1050 | 80 | 7 | 1.4 | 11 | — |
| Embodiments | 5 | Stainless Steel | 7 | 20 | 15 | 570 | 950 | 90 | 5 | 3.8 | 13 | — |
| | 6 | | 8 | 20 | 10 | 530 | 1000 | 70 | 9 | 2.5 | 15 | — |

Figure 1:
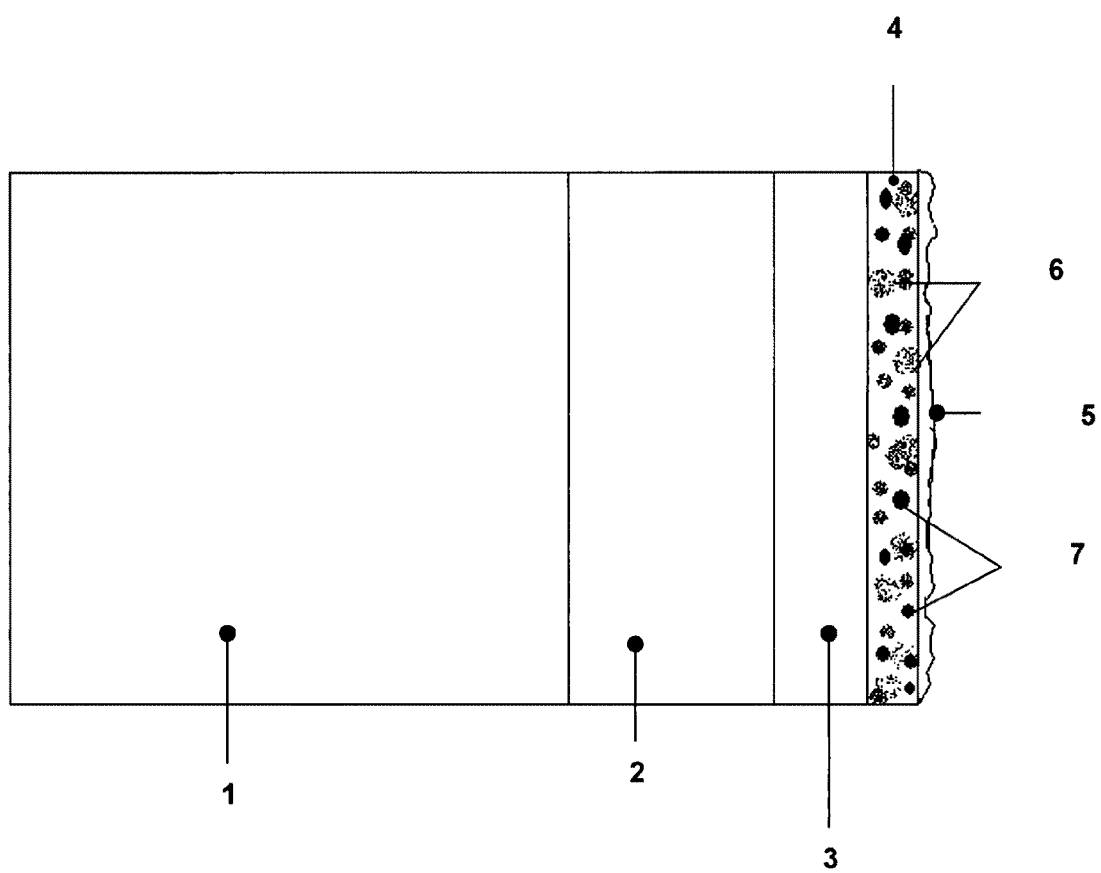
FIG. 1 represents a cross-section of a piston ring showing base material and the layers described in the embodiments of the present invention, as follows:
1. Base material in steel or cast iron
2. Diffusion nitrided layer
3. Compound layer
4. Sulphide rich compound layer
5. Continuous iron sulphide layer (optional).
Figure 2:
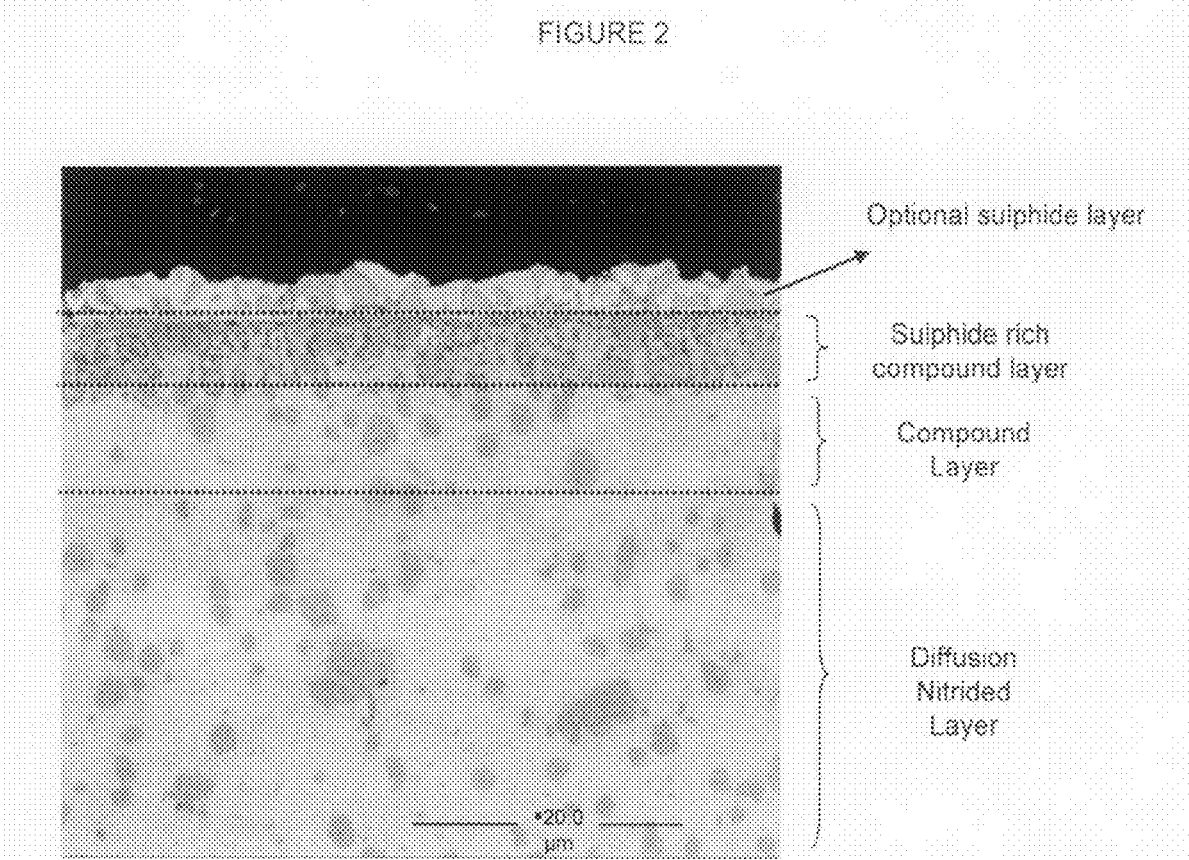
FIG. 2 is a SEM (Scanning Electron Microscope) photomicrograph of the piston ring cross-section of the present invention, showing optional sulphide layer, sulphide rich compound layer, compound layer and diffusion layer.
Figure 3:
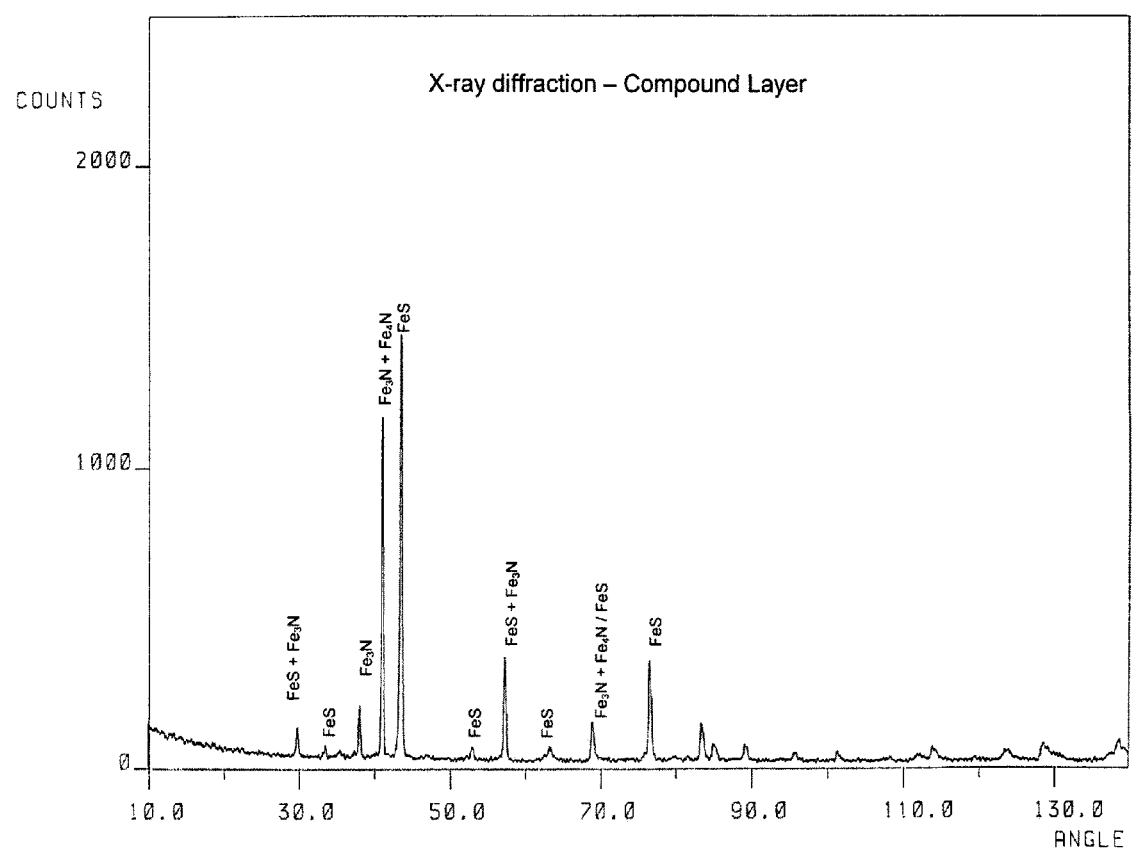
FIG. 3 is a X-ray diffraction graph obtained with Cu tube of the sulphide rich compound layer, presenting peaks of the following elements.
Figure 4:
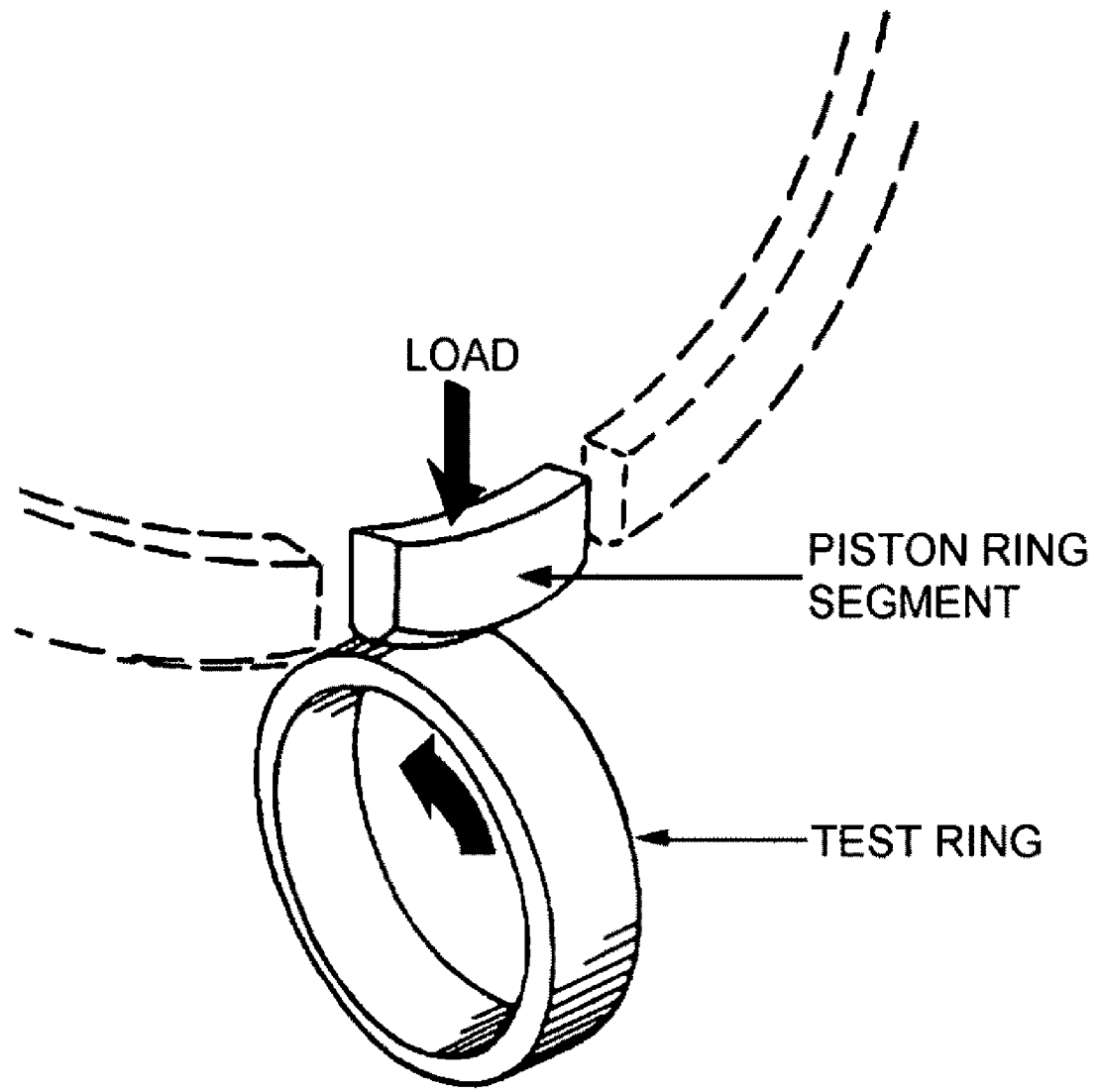

FIG. 4 describes a schematic diagram of the tribological system used for the bench test evaluation.

Figure 5:
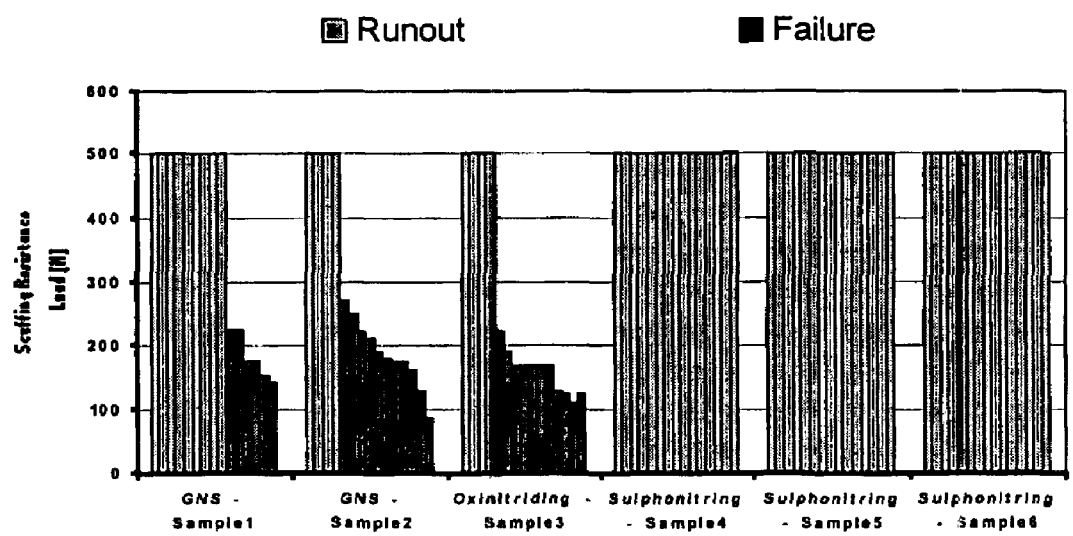

FIG. 5 shows a graph with the results from a Block-on-Ring bench test.

DESCRIPTION OF THE PREFERRED EMBODIMENTS

EXAMPLE 1

Bench Test

With the aforementioned method, sample rings of the present invention were produced according to the parameters and characteristics as shown in table 1 below and submitted to Block-on-Ring bench test. Such samples were compared to nitrided and oxynitrided rings from the prior art regarding scuffing resistance.

Segments of piston ring samples were used as test piece and a steel sample was used as counter part. An external load F applied by a lever system kept both parts together. Lube oil was taken to the contact interface by the partial immersion of the rotor in the oil reservoir (see FIG. 4).

The test consisted in running the rotor in constant speed while the load F was increased progressively. The test was Graph 1: Results from Block-on-ring bench test. 15 tests were performed for each sample. The results can be observed on graph 1 as shown in FIG. 5. For samples 1, 2 and 3, of the prior art, 6 out of 15, 11 out of 15 and 11 out of 15 test pieces failed, respectively. While for samples 4 to 6, object of the present invention, failure was not observed for any test piece. These results lead to the conclusion that the rings treated with the sulphonitriding method of the present invention are more resistant to scuffing occurrence, because when the oil film is broken, the sulphide rich compound layer creates favorable conditions for accepting lubricants (pro-vides better lubrication conditions), since the FeS inclusions flow plastically under load, increasing the contact between the mating surfaces. Additionally, FeS acts as a solid lubricant keeping the smoothness of the surface under high load.

In the case of the oxynitrided parts, there are limitations concerning scuffing occurrence on oxygen-containing layers because a brittle porous rigid area is developed in the outer region of the composite layer surface, negatively influencing the operational behavior of the components stressed by sliding friction. The oxynitrided layer was unsuitable for components subjected to sliding friction conditions since cracks can be formed on this layer.

Samples 1 and 5 were selected for further engine tests, to validate the concept.

EXAMPLE 2

Engine Test

The burning mark test is an engine test to determine seizure resistance of the piston rings, such as flake out and scuffing occurrence. It forms the basis for comparing the surface treatments of base materials or surface coatings of piston rings regarding their potential to withstand high thermal loads, lack of oil film, i.e. extreme engine conditions. The present burning mark test was applied on gasoline engines with high specific power output and more severe parameters than the standard ones. The investigations have been concentrated on the top ring, which withstands the highest temperatures and less lubricant oil supply of the ring pack.

On Table 2 below the burning mark test conditions.

TABLE 2

Parameters for the engine tests
BURNING MARK TEST

| | |
|---|---|
| Test engine: | Gasoline with Turbocharger |
| Specific power output: | 80 kW/l |
| Fuel: | Gasoline (ROZ 102) |
| Test program: | 10 h at rated power |
| Coolant temperature: | 100, 110, 120, 130° C. |
| Oil temperature: | 150° C. |
| Charge air temperature: | 90° C. |

Rings from samples 1 (GNS—Prior Art) and 5 (sulphonitriding—according to the invention) were assembled in the same engine; cylinders 1 and 3 were assembled with rings from sample 1, while cylinders 2 and 4 were assembled with rings from sample 5. This configuration was kept for all the tests performed. The rings were submitted to a burning mark test in a 4 cylinders 80 KW/l Gasoline with turbocharger engine. In a dynamometer cell, the engine was submitted to crescent temperatures, being inspected in each temperature level.

Four different engine tests were carried out by varying the coolant temperature. Temperatures used were the following: 100° C., 110° C., 120° C. and 130° C. Temperature was chosen as a parameter to be varied because it is an important factor, leading the piston rings to extreme working conditions.

Visual and metallurgical evaluation of the rings on a comparative basis was made after 10 h running period at rated power. After completion of the test, it was found different patterns of burning marks at the running face of sample rings 1 and 4, which are presented on Table 3.

TABLE 3

Results from burning mark engine test.

| Temp | Cyl. 1 GNS - Sample 1 | Cyl. 2 Sulphonitriding - Sample 4 | Cyl. 3 GNS - Sample 2 | Cyl. 4 Sulphonitriding - Sample 5 |
|---|---|---|---|---|
| 100° C. | OK | OK | OK | OK |
| 110° C. | Slight Burning Mark | OK | Slight Burning Mark | OK |
| 120° C. | Hard Burning Mark | OK | Hard Burning Mark | OK |
| 130° C. | Total Ring Scuffing | Hard Burning Mark | Total Ring Scuffing | Hard Burning Mark |

Legend:
- ▬ Slight Burning Mark
- ▬ Hard Burning Mark
- ▬ Total Ring Scuffing

An engine test was performed for each temperature of the coolant:

Both technologies did not show any problems for coolant temperature of 100° C.

For coolant temperature of 110°, samples with sulphonitriding ran without any damage while GNS samples started to present occurrence of burning marks.

The subsequent test with coolant temperature of 120° C. showed good performance for sulphonitrided rings, but GNS rings had hard burning marks on both cylinders tested.

For the test with coolant temperature of 130° C., the rings with gas nitriding showed catastrophic damage, while the sulphonitrided rings had hard burning marks, but without failure. Despite the extreme conditions of the engine test at the highest temperatures, the sulphonitrided layer survived without catastrophic damages due to the good combination of high hardness of the nitrided layer with the lubricant properties of the small inclusions of FeS, providing the desired effect of decrease of the friction coefficient and improved wear properties.

Although the present invention has been described with reference to the preferred embodiments, it is apparent that the present invention is not limited to the aforesaid preferred embodiments, but various modifications can be attained without departing from its scope.

What is claimed is:

1. A piston ring for an internal combustion engine comprising:
   a sulphide rich compound layer forming a surface layer, said sulphide rich compound layer comprising an iron nitride matrix with iron sulphide (FeS) inclusions embedded in said matrix, said sulphide rich compound layer having a sulphur content of 1 to 4 wt % S and a nitrogen content of 10 to 20 wt % N.

2. A piston ring according to claim 1, wherein the matrix of the sulphide rich compound layer comprises $\epsilon$-phases ($Fe_{2-3}N$) and $\gamma$-phases ($Fe_4N$) of iron nitride.

3. A piston ring according to claim 1, wherein said sulphide rich compound layer further comprises multi-phases, with at least two phases being selected from the group consisting of $Fe_{2-3}N$, $Fe_4N$, $Fe_4NC$, CrN and CrCN.

4. A piston ring according to claim 1, wherein said sulphide rich compound layer has a thickness of 1.0 to 10 μm.

5. A piston ring according to claim 1, wherein said sulphide rich compound layer has a hardness between 800 and 1200 Vickers.

6. A piston ring according to claim 1, wherein said sulphide rich compound layer has a thickness of 0.1 to 10 μm.

7. A piston ring according to claim 1, wherein a continuous FeS layer is formed upon the sulphide rich compound layer.

8. A piston ring for an internal combustion engine comprising:
   (a) a base material;
   (b) a diffusion layer formed on said base material;
   (c) a compound layer formed on said diffusion layer;
   (d) a sulfide rich compound layer, said sulphide rich compound layer comprising an iron nitride matrix with iron sulphide (FeS) inclusions embedded in said matrix, said sulphide rich compound layer having a sulphur content of 1 to 4 wt % S and a nitrogen content of 10 to 20 wt % N.

9. A piston ring according to claim 8, wherein the matrix of the sulphide rich compound layer comprises $\epsilon$-phases ($Fe_{2-3}$N) and $\gamma$-phases ($Fe_4$N) of iron nitride.

10. A piston ring according to claim 8, wherein said sulphide rich compound layer has a thickness of 1.0 to 10 µm.

11. A piston ring according to claim 8, wherein said sulphide rich compound layer has a hardness between 800 and 1200 Vickers.

12. A piston ring according to claim 8, wherein a continuous FeS layer is formed upon the sulphide rich compound layer.

13. A piston ring according to claim 8, wherein said sulphide rich compound layer further comprises multi-phases, with at least two phases being selected from the group consisting of $Fe_{2-3}$N, $Fe_4$N, $Fe_4$NC, CrN and CrCN.

14. A piston ring according to claim 8, wherein said sulphide rich compound layer has a thickness of 0.1 to 10 µm.

15. A piston ring according to claim 8, wherein said compound layer comprises $\epsilon$-phases ($Fe_{2-3}$N) and $\gamma$-phases ($Fe_4$N) of iron nitride.

16. A piston ring according to claim 8, wherein said compound layer has a thickness of 0.1 to 10 µm.

17. A piston ring according to claim 8, wherein said base material consists of steel or cast iron.

\* \* \* \* \*